Nov. 4, 1969   J. HAISMA   3,477,036

GAS LASER

Filed Sept. 10, 1965

INVENTOR.
JAN HAISMA
BY

*AGENT*

United States Patent Office 3,477,036
Patented Nov. 4, 1969

3,477,036
GAS LASER
Jan Haisma, Emmasingel, Eindhoven, Netherlands, assignor, by mesne assignments, to U.S. Philips Corporation, New York, N.Y., a corporation of Delaware
Filed Sept. 10, 1965, Ser. No. 486,384
Claims priority, application Netherlands, Sept. 24, 1964, 6411121
Int. Cl. H01s 3/22
U.S. Cl. 331—94.5      7 Claims

ABSTRACT OF THE DISCLOSURE

A gas laser comprising a block of insulating material having a gas discharge channel and energizing means for initiating the discharge in said channel, first and second reflector plates, each of the said reflector plates optically enclosing a respective end of the channel, an electrostrictive element connecting one of the reflector plates to said block and having dimensions alterable in accordance with an electrical signal applied to the element.

---

Figure 1:
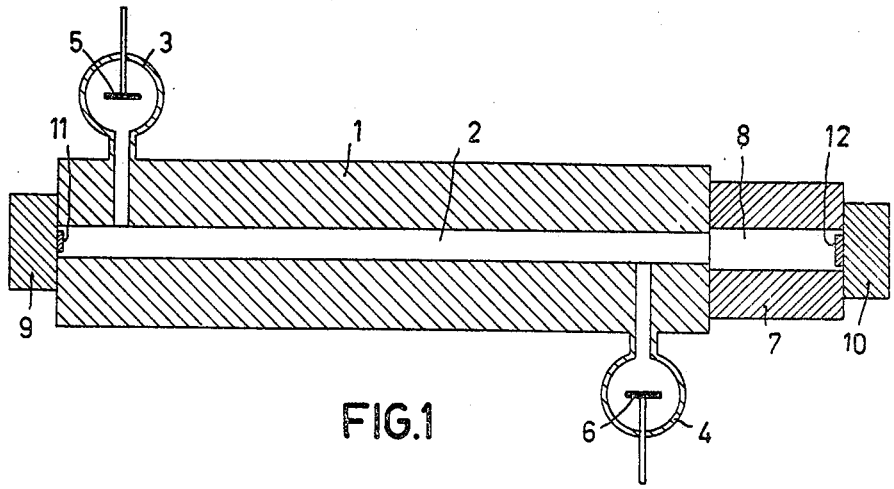

The invention relates to a gas laser construction wherein the gas discharge takes place in a narrow channel in a solid block of insulating material, to the ends of which are sprung the reflecting members with ground fitting surfaces.

Gas lasers of the kind set forth have the advantage of great stability and easy handling and it is well known that detuning of the optical cavity resonator can be obtained with the aid of a simple electric heating element surrounding the block of insulating material. However, such thermal detuning is performed slowly and is therefore objectionable in many cases.

It is similarly known to use electrostrictive elements in lasers for support of one of the mirrors arranged independently of the discharge space. This requires an accurate relative arrangement of the discharge space and the tuning element.

The invention has for its object to provide a simple and improved construction for a laser.

In accordance with the invention, a gas laser is constructed such that the gas discharge takes place in a narrow channel within a solid block of insulating material. Reflecting members with ground fitting surfaces are securely affixed or "sprung" onto the ends of the block in an airtight manner and between the block of insulating material and one of the reflecting members there is provided a cylindrical, electrostrictive body having a channel for the light beam. Electrodes are provided at the axial ends of the body. Glass or quartz plates having ground fitting surfaces on the outside are fused or cemented to the ends of said body while the connection with the block of insulating material on the one hand and with the reflecting member on the other is established in a vacuum-tight manner by springing.

The construction according to the invention provides an arrangement having the same stability as the known laser without a detuning element, the influence of the thermal detuning compensated in not too large a temperature range by means of the electrostrictive element; at the same time, by way of modulation, an alternating voltage of the desired frequency and modulation can be applied to the electrostrictive element.

The electrodes of the electrostrictive element may be provided, in accordance with the invention, in the form of metal coatings of axial or radial grooves near the end faces of the electrostrictive body. In the case of larger deflections of the electrostrictive body difficulties might arise in that the axial deviation is greater than that near the circumference. In accordance with a further embodiment of the invention, these difficulties can be avoided by springing the block of insulating material and the reflecting member only at the central portion or the edge onto the glass or quartz plates. Electrostrictive material may exhibit a tendency to give off impurities to the gas filling. This can be avoided, in accordance with the invention, by fastening a glass tube in the channel of the electrostrictive body by means of an elastic cement, which tube is prolonged into the fused or cemented plates.

Figure 2:
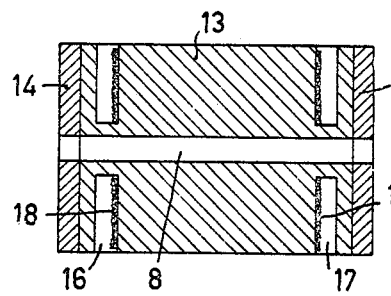
Figure 3:
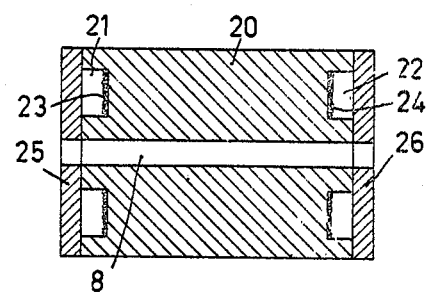
Figure 4:
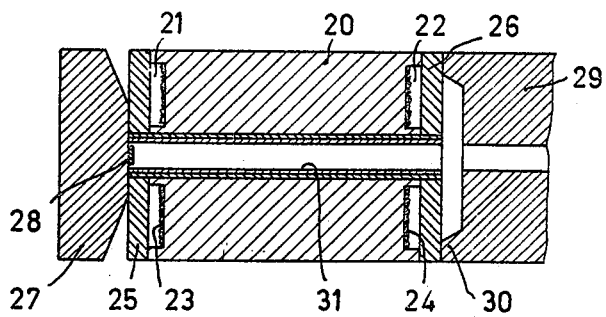

The invention will be described more fully with reference to the drawings, in which FIG. 1 shows a gas laser with an electrostrictive element according to the invention and FIGS. 2, 3 and 4 show three embodiments of the electrostrictive element.

Referring to FIG. 1, reference numeral 1 designates a quartz block of a length of 12 cms. and a diameter of 3.5 cms., in which an axial channel 2 of a diameter of 3 mms. is provided. Short widened side tubes 3 and 4 accommodate the two discharge electrodes 5 and 6. At the right-hand end an electrostrictive element 7 is arranged with the aid of ground fitting surfaces, a channel 8 being provided in said element. At the left-hand end of the quartz block and at the right-hand end of the electrostrictive element quartz reflector plates 9 and 10 are sprung in a vacuum-tight manner with the aid of ground fitting surfaces. The dichroic layers 11 and 12 are provided on the quartz plates for the desired laser line.

FIG. 2 shows the electrostrictive element in the form of a block 13 of barium titanate. Glass plates 14 and 15 with parallel optically ground outer fitting surfaces are fused to the ends. The channel 8 of the block 13 is prolonged in the plates 14 and 15. Near the ends of the block 13 radial grooves 16 and 17 are made up to a few millimetres from the channel 8. On the neighbouring sides of the grooves 16 and 17 silver coatings 18 and 19 are provided by way of electrodes, provide with supply wires (not shown).

FIG. 3 shows the barium titanate block 20 which has axial grooves 21 and 22, electrodes 23 and 24 being arranged at the bottoms thereof. The outer wall of the groove is removed at a few places symmetrically distributed along the circumference. The ends of the block are ground to a high degree of flatness and quartz plates 25 and 26 are cemented thereto. The two outer faces of the plates 25 and 26 are ground to optical flatness and parallel to each other in order to allow joining by springing. FIG. 4 shows the electrostrictive element of the same structure as in FIG. 3. The reflector plate 27, which supports the dichroic layer 28, is sprung only at the centre and the block of insulating material 29, in which the discharge takes place is sprung only at the edge 30. The channel is provided with a glass tube 31, fastened by cementing.

What is claimed is:

1. A gas laser comprising a block of insulating material having a gas discharge channel therein, energizing means for initiating said discharge in said channel, first and second reflector plates, said first reflector plate being attached at one end of said block and enclosing one end of said channel, an electrostrictive element having a channel therein, a first end of said electrostrictive element being attached to the other end of said block with each of the channels of said block and element in substantial axial alignment, said second reflector plate being attached to the remote end face of said electrostrictive element for enclosing the remaining end of said channels, and means for energizing said electrostrictive element.

2. The combination of claim 1 wherein said energizing means initiating said discharge includes a first and second electrode attached to said block and extending into said channel.

3. The combination of claim 1 wherein said electrostrictive element includes first and second end plates each having a channel therein, said first and second plates each respectively forming the said first and second end faces of said element, each of the channel portions of each of the respective plates and element being in substantial axial alignment.

4. The combination of claim 1 wherein said electrostrictive element includes electrodes affixed to said electrostrictive element in a plurality of radial grooves arranged about the end of said element concentrically with said channel.

5. The combination of claim 1 wherein said electrostrictive element is composed of barium titanate.

6. The combination of claim 4 wherein each of said end faces is ground to a high degree of optical flatness.

7. A gas laser comprising a block of insulating material having a gas discharge channel therein, energizing means for initiating said discharge in said channel, first and second reflector plates, each of said plates having dichroic layers affixed thereto, said first reflector plate vacuum sealed to one end of said block for optically enclosing one end of said channel with the dichroic layer of said first reflector plate, an electrostrictive element having a channel therein and having electrodes affixed thereto, first and second end plates, each having a channel therein, said first and second end plates each respectively forming the first and second end faces of said element, each of the channel portions of each of the respective end plates and said element being in substantial axial alignment, a first end face of said electrostrictive element attached to the other end of said block at the outer perimeter thereof with each of the respective channels of said block and element in substantial axial alignment, said second reflector plate vacuum sealed to the second end face of said electrostrictive element at the inner perimeter thereof, for optically enclosing the remaining end of said channels with the dichroic layer of said second reflector plate.

References Cited

UNITED STATES PATENTS

| | | | |
|---|---|---|---|
| 3,166,673 | 1/1965 | Vickery et al. | 332—7.51 |
| 3,256,443 | 6/1966 | Moore | 332—7.51 |
| 3,201,709 | 8/1965 | Boyd | 330—4.5 |
| 3,297,876 | 1/1967 | De Maria | 332—7.51 |

JOHN KOMINSKI, Primary Examiner

DARWIN R. HOSTETTER, Assistant Examiner

U.S. Cl. X.R.

332—7.51